(12) United States Patent
Suzuki et al.

(10) Patent No.: US 6,301,638 B1
(45) Date of Patent: Oct. 9, 2001

(54) METHOD FOR DISPLAYING DATA ON A CD HAVING CD-TEXT DATA

(75) Inventors: Yosuke Suzuki, Kanagawa; Masahiro Takahashi, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/255,086

(22) Filed: Feb. 22, 1999

(30) Foreign Application Priority Data

Feb. 25, 1998 (JP) .................................................. 10-043459

(51) Int. Cl.$^7$ .................................................. G09B 15/02
(52) U.S. Cl. .................. 711/112; 711/4; 711/111; 711/115
(58) Field of Search ............................. 711/4, 111, 112; 369/30–43

(56) References Cited

U.S. PATENT DOCUMENTS 5,925,843 * 7/1999 Miller et al. ............................. 84/609
5,930,768 * 7/1999 Hooban ................................... 705/27
5,969,283 * 10/1999 Looney et al. .......................... 84/609

OTHER PUBLICATIONS

Sony Press Release (As of Sep. 14, 2000). http://www.sony-cp.com/_E/News/news48.html. Munich, Jan. 1997.*
"Red Book" definition(As of Sep. 14, 2000) http://www.www.disctronics.co.uk/cdref/cdbooks/redbook.html.*
CD/R Book Standard (As of Sep. 14, 2000).http://www.xdr2.com/CDR–Info/Books.html.*
Computall Services (As of Sep. 4, 2000). http://www-.freenet.carleton.ca/~aa571/cdtext.html.*

* cited by examiner

Primary Examiner—Than Nguyen
(74) Attorney, Agent, or Firm—Jay H. Maioli

(57) ABSTRACT

A reproducing method for obtaining character information in a plurality of languages from a CD-ROM drive and automatically displaying the character information in the most proper language on a screen. An optical disc drive and a host computer 53 are connected through an interface 42. The drive has a servo and signal processing portion 30, a system controller 41, and a CD-ROM signal processing portion 50. The servo and signal processing portion 30 reproduces data from a disc 21. The system controller 41 controls the entire operation of the drive. The drive sends back return data corresponding to a read TOC command to a computer 53. The computer 53 determines whether or not CD-TEXT data contains character information of a language corresponding to the country information of the OS. When the CD-TEXT data contains the character information, the computer 53 displays the character information. Otherwise, the computer 53 displays character information in a predetermined language (English of block 0).

5 Claims, 24 Drawing Sheets

Fig. 5

| FRAME | P | Q | R | S | T | U | V | W |
|---|---|---|---|---|---|---|---|---|
| F01 | | | | S0 | | | | |
| F02 | | | | S1 | | | | |
| F03 | P01 | Q01 | R01 | S01 | T01 | U01 | V01 | W01 |
| F04 | P02 | Q02 | R02 | S02 | T02 | U02 | V02 | W02 |
| ... | ... | ... | ... | ... | ... | ... | ... | ... |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

137

S0=00100000000001
S1=000000000010010

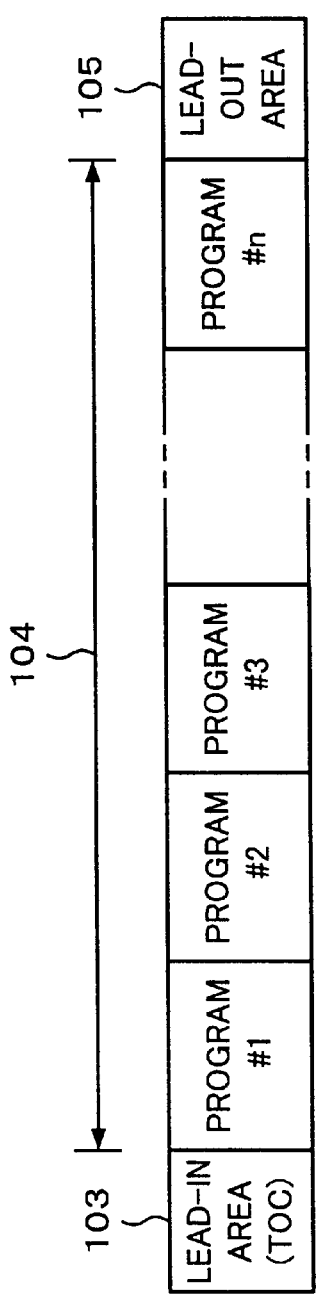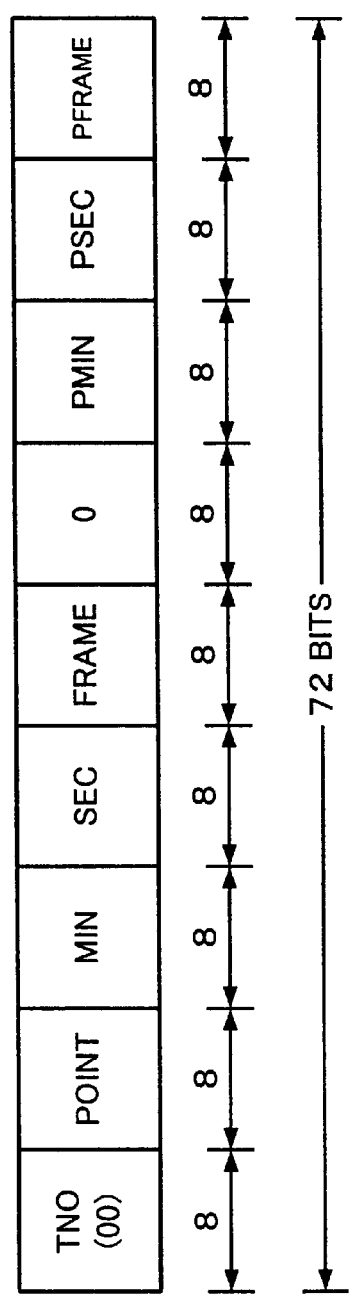
Fig. 6A
Fig. 6B

Fig. 7

| TNO | BLOCK | POINT | PMIN,PSEC,PFRAME | |
|---|---|---|---|---|
| 00 | n | 01 | 00. 02. 32 | START POINT OF TRACK #1 |
| | n + 1 | 01 | 00. 02. 32 | |
| | n + 2 | 01 | 00. 02. 32 | |
| | n + 3 | 02 | 10. 15. 12 | START POINT OF TRACK #2 |
| | n + 4 | 02 | 10. 15. 12 | |
| | n + 5 | 02 | 10. 15. 12 | |
| | n + 6 | 03 | 16. 28. 63 | START POINT OF TRACK #3 |
| | n + 7 | 03 | 16. 28. 63 | |
| | n + 8 | 03 | 16. 28. 63 | |
| | n + 9 | 04 | • • | |
| | n + 10 | 04 | • • | |
| | n + 11 | 04 | • • | |
| | n + 12 | 05 | • • | |
| | n + 13 | 05 | • • | |
| | n + 14 | 05 | • • | |
| | n + 15 | 06 | 19. 00. 03 | START POINT OF TRACK #6 |
| | n + 16 | 06 | 19. 00. 03 | |
| | n + 17 | 06 | 19. 00. 03 | |
| | n + 18 | A0 | 01. 00. 00 | TRACK NUMBER OF FIRST TRACK OF DISC |
| | n + 19 | A0 | 01. 00. 00 | |
| | n + 20 | A0 | 01. 00. 00 | |
| | n + 21 | A1 | 06. 00. 00 | TRACK NUMBER OF LAST TRACK OF DISC |
| | n + 22 | A1 | 06. 00. 00 | |
| | n + 23 | A1 | 06. 00. 00 | |
| | n + 24 | A2 | 52. 48. 41 | START POINT OF LEAD-OUT AREA |
| | n + 25 | A2 | 52. 48. 41 | |
| 00 | n + 26 | A2 | 52. 48. 41 | |
| 00 | n + 27 | 01 | 00. 02. 32 | REPEATED |
| | n + 28 | 01 | 00. 02. 32 | |

ITEM
80h=ALBUM NAME/SONG NAME
81h=PERFORMER NAME/CONDUCTOR NAME/ORCHESTRA NAME
82h=SONG WRITER NAME
83h=COMPOSER NAME
84h=ARRANGER NAME
85h=MESSAGE
86h=DISC ID
87h=SEARCH KEYWORD
88h=TOC
89h=2ND TOC
8ah=RESERVED
8bh=RESERVED
8ch=RESERVED
8dh=CLOSED INFORMATION
8eh=UPC/EAN AND ISRC
8fh=BLOCK SIZE

BLOCK SEQUENTIAL NUMBER RANGING FROM 00 TO 255 (0h TO FFh)

DBCC BLOCK NUMBER

CHARACTER POSITION OF CURRENT PACK

0000 = FIRST CHARACTER
0001 = SECOND CHARACTER
0010 = THIRD CHARACTER
0011 = FOURTH CHARACTER
0100 = FIFTH CHARACTER
0101 = SIXTH CHARACTER
.
.
1110 = FIFTEENTH CHARACTER
1111 = SIXTEENTH OR LATER CHARACTER

Fig. 16

| ID1 | ID2 | ID3 | ID4 | TEXT1 | TEXT2 | TEXT3 | TEXT4 | TEXT5 | TEXT6 | TEXT7 | TEXT8 | TEXT9 | TEXT10 | TEXT11 | TEXT12 | CRC |
|---|---|---|---|---|---|---|---|---|---|---|---|---|---|---|---|---|
| 8fh | PACK ELEMENT 00h | SEQUEN- TIAL NUMBER | BLOCK NO. | CHAR- ACTER CODE OF CURRENT BLOCK | FIRST TRACK NUMBER | LAST TRACK NUMBER | MODE 2 & COPY PRO- TEC- TION FLAG | NUMBER OF PACKS OF ID1=80h | NUMBER OF PACKS OF ID1=81h | NUMBER OF PACKS OF ID1=82h | NUMBER OF PACKS OF ID1=83h | NUMBER OF PACKS OF ID1=84h | NUMBER OF PACKS OF ID1=85h | NUMBER OF PACKS OF ID1=86h | NUMBER OF PACKS OF ID1=87h | |

Fig. 17

| ID1 | ID2 | ID3 | ID4 | TEXT1 | TEXT2 | TEXT3 | TEXT4 | TEXT5 | TEXT6 | TEXT7 | TEXT8 | TEXT9 | TEXT10 | TEXT11 | TEXT12 | CRC |
|---|---|---|---|---|---|---|---|---|---|---|---|---|---|---|---|---|
| 8fh | PACK ELEMENT 01h | SEQUEN- TIAL NUMBER | BLOCK NO. | NUMBER OF PACKS ID1=88h | NUMBER OF PACKS ID1=89h | NUMBER OF PACKS ID1=8ah | NUMBER OF PACKS ID1=8bh | NUMBER OF PACKS ID1=8ch | NUMBER OF PACKS ID1=8dh | NUMBER OF PACKS ID1=8eh | NUMBER OF PACKS ID1=8fh | LAST SEQUEN- TIAL NUMBER OF BLOCK0 | LAST SEQUEN- TIAL NUMBER OF BLOCK1 | LAST SEQUEN- TIAL NUMBER OF BLOCK2 | LAST SEQUEN- TIAL NUMBER OF BLOCK3 | |

*Fig. 18*

| ID1 | ID2 | ID3 | ID4 | TEXT1 | TEXT2 | TEXT3 | TEXT4 | TEXT5 | TEXT6 | TEXT7 | TEXT8 | TEXT9 | TEXT10 | TEXT11 | TEXT12 | CRC |
|---|---|---|---|---|---|---|---|---|---|---|---|---|---|---|---|---|
| 8fh | PACK ELEMENT 02h | SEQUEN- TIAL NUMBER | BLOCK NO. | LAST SEQUEN- TIAL NUMBER OF BLOCK4 | LAST SEQUEN- TIAL NUMBER OF BLOCK5 | LAST SEQUEN- TIAL NUMBER OF BLOCK6 | LAST SEQUEN- TIAL NUMBER OF BLOCK7 | LAN- GUAGE CODE OF BLOCK0 | LAN- GUAGE CODE OF BLOCK1 | LAN- GUAGE CODE OF BLOCK2 | LAN- GUAGE CODE OF BLOCK3 | LAN- GUAGE CODE OF BLOCK4 | LAN- GUAGE CODE OF BLOCK5 | LAN- GUAGE CODE OF BLOCK6 | LAN- GUAGE CODE OF BLOCK7 | |

Fig. 19

| LANGUAGE CODE (HEXADECIMAL) | LANGUAGE | LANGUAGE CODE (HEXADECIMAL) | LANGUAGE |
|---|---|---|---|
| 00 | Unknown/not applicable | 20 | Polish |
| 01 | Albanian | 21 | Portuguese |
| 02 | Breton | 22 | Romanian |
| 03 | Catalan | 23 | Romansh |
| 04 | Croatian | 24 | Serbian |
| 05 | Welsh | 25 | Slovak |
| 06 | Czech | 26 | Slovene |
| 07 | Danish | 27 | Finnish |
| 08 | German | 28 | Swedish |
| 09 | English | 29 | Turkish |
| 0A | Spanish | 2A | Flemish |
| 0B | Esperanto | 2B | Walloon |
| 0C | Estonian | 2C | |
| 0D | Basque | 2D | |
| 0E | Faroese | 2E | |
| 0F | French | 2F | |
| 10 | Frisian | 30 | ⎤ |
| 11 | Irish | 31 | ⎟ |
| 12 | Gaelic | 32 | ⎟ |
| 13 | Galician | 33 | ⎟ |
| 14 | Icelandic | 34 | ⎟ |
| 15 | Italian | 35 | ⎟ |
| 16 | Lappish | 36 | ⎟ |
| 17 | Latin | 37 | Reserved for |
| 18 | Latvian | 38 | national assignment |
| 19 | Luxembourgian | 39 | ⎟ |
| 1A | Lithuanian | 3A | ⎟ |
| 1B | Hungarian | 3B | ⎟ |
| 1C | Maltese | 3C | ⎟ |
| 1D | Dutch | 3D | ⎟ |
| 1E | Norwegian | 3E | ⎟ |
| 1F | Occitan | 3F | ⎦ |

Fig. 20

| LANGUAGE CODE (HEXADECIMAL) | LANGUAGE | LANGUAGE CODE (HEXADECIMAL) | LANGUAGE |
|---|---|---|---|
| 7F | Amharic | 5F | Marathi |
| 7E | Arabic | 5E | Ndebele |
| 7D | Armenian | 5D | Nepali |
| 7C | Assamese | 5C | Oriya |
| 7B | Azerbijani | 5B | Papamiento |
| 7A | Bambora | 5A | Persian |
| 79 | Belorussian | 59 | Punjabi |
| 78 | Bengali | 58 | Pushtu |
| 77 | Bulgarian | 57 | Quechua |
| 76 | Burmese | 56 | Russian |
| 75 | Chinese | 55 | Ruthenian |
| 74 | Churash | 54 | Serbo-Croatian |
| 73 | Dari | 53 | Shona |
| 72 | Fulani | 52 | Sinhalese |
| 71 | Georgian | 51 | Somali |
| 70 | Greek | 50 | Sranan Tor |
| 6F | Gujurati | 4F | Swahili |
| 6E | Gurani | 4E | Tadzhik |
| 6D | Hausa | 4D | Tamil |
| 6C | Hebrew | 4C | Tatar |
| 6B | Hindi | 4B | Telugu |
| 6A | Indonesian | 4A | Thai |
| 69 | Japanese | 49 | Ukrainian |
| 68 | Kannada | 48 | Urdu |
| 67 | Kazakh | 47 | Uzbek |
| 66 | Khmer | 46 | Vietnamese |
| 65 | Korean | 45 | Zulu |
| 64 | Laotian | 44 | |
| 63 | Macedonian | 43 | |
| 62 | Malagasay | 42 | |
| 61 | Malaysian | 41 | |
| 60 | Moldavian | 40 | |

Fig. 23A

LANGUAGE NAME TABLE

| LANGUAGE CODE | LANGUAGE NAME |
|---|---|
| 00 | Unknown |
| 01 | Albanian |
| ⋮ | ⋮ |

Fig. 23B

LANGUAGE CODE TABLE

| BLOCK | 0 | 1 | 2 | 3 | 4 | 5 | 6 | 7 |
|---|---|---|---|---|---|---|---|---|
| LANGUAGE CODE | 09 | 69 | 08 | 0F | | | | |

Fig. 23C

OS COUNTRY INFORMATION

↓ CONVERSION

LANGUAGE CODE

METHOD FOR DISPLAYING DATA ON A CD HAVING CD-TEXT DATA

BACKGROUND OF THE INVENTION

1. Field of the Invention

This invention relates to a reproducing method for reproducing data from a recording medium for example a digital audio CD (Compact Disc), in particular, a reproducing method being accomplished as an application program of a computer and a computer readable record medium on which such an application program has been recorded.

2. Description of the Related Art

As storing units for computers, CD-ROMs that feature large storage capacity, high speed access, low cost, and so forth and their drives have been widely used. A CD-ROM is a derivative of a CD-DA (simply referred to as CD) on which a digital audio signal is recorded. Normally, computer data such as an application program is recorded on a CD-ROM. As an application of a personal computer, an application program that allows a CD-ROM drive of a personal computer to function as a CD player is known.

In a conventional CD player (dedicated unit), for user's convenience, various types of information corresponding to reproduction information of a disc are displayed. As well-known examples, program numbers (so-called track numbers) recorded to sub-codes of Q channel as mode 1 and time information assigned to each track number are reproduced and displayed.

In addition, a format of which character information such as an album title of a CD is recorded to sub-codes of R to W channels in a lead-in area has been proposed. This format is referred to as CD-TEXT. As the CD-TEXT format, lead-in information (mode 4) and program area information (mode 2) have been defined. When TOC is read, the lead-in information is stored in a memory (RAM) of a reproducing unit. When the user desires the information, it can be displayed. On the other hand, information of the program area can be displayed at a timing designated by a producer of the CD. The present invention is applied to the mode 4 of the CD-TEXT format.

In the case of a CD player, when data is reproduced from a CD corresponding to the CD-TEXT format, the CD-TEXT information is read at a timing of which the CD is loaded to the CD player. The CD-TEXT information is decoded and stored in the memory. When necessary, the CD-TEXT information is displayed. Since the album title, performer name, and so forth of the CD are displayed, the user can easily know the contents of the CD.

In the CD-TEXT format, information of around 6500 characters can be recorded. Since information of most of album titles of CDs is 800 characters or less, character information in eight languages can be recorded. As will be described later, in the CD-TEXT format, a text group is composed of block 0 to block 7 corresponding to up to eight languages. In each block, one character code is used. Block 0 is always required. When the storage capacity of the memory of a CD player is small, only the block 0 is read with priority. Thus, an internationally common language such as English is assigned to a low-number block.

An application program that allows a computer to function as a CD player is preferably applicable to the CD-TEXT format. However, in a system of which a conventional drive such as a CD-ROM drive is connected to a host computer, an application program of the host computer does not obtain CD-TEXT information. In other words, a method for allowing such an application program to obtain CD-TEXT information is not known. The applicant of the present invention has proposed a CD player that displays information recorded on a CD-TEXT disc in a plurality of languages and that allows the user to select a desired language. However, on this CD player, the user should designate a desired language for each CD. In other words, the CD player is not user-friendly.

OBJECTS AND SUMMARY OF THE INVENTION

It is therefore an object of the invention to provide a reproducing method that allows character information recorded in a management area of a record medium to be displayed in the most proper language of a plurality of languages of the character information when the record medium is loaded to a drive without a user's selecting operation. Another object of the present invention is to provide a recording medium on which a program for such a reproducing method is recorded.

According to the present invention, there is provided a reproducing method for causing a computer to obtain data reproduced from a recording medium loaded to a drive, the recording medium being formatted in such a manner that at least one program and character information associated therewith are recorded on the recording medium, the character information being written in at least one of a plurality of languages, at least one of a plurality of language codes corresponding to the plurality of languages being recorded in a management area of the recording medium, the reproducing method comprising the steps of:

obtaining data reproduced from the management area by the drive;

detecting a language of character information associated with a program recorded on the recording medium corresponding to a language code of the obtained data;

detecting country information of an operating system of the computer;

determining whether or not character information of a language corresponding to the country information of the operating system has been recorded on the recording medium; and displaying character information when the character information in the language corresponding to the country information has been recorded on the recording medium as the determined result of the determining step.

According to the present invention of claim 5, there is provided a recording medium from which a computer reads a program for a reproducing method for causing the computer to obtain data reproduced from a recording medium loaded to a drive, the recording medium being formatted in such a manner that at least one program and character information associated with the program are recorded on the recording medium, the character information being written in at least one of a plurality of languages, at least one of a plurality of language codes corresponding to the plurality of languages being recorded in a management area of the recording medium, the reproducing method comprising the steps of:

obtaining data reproduced from the management area by the drive;

detecting a language of character information associated with a program recorded on the recording medium corresponding to a language code of the obtained data;

detecting country information of an operating system of the computer;

determining whether or not character information of the language corresponding to the country information of the operating system has been recorded on the recording medium; and displaying character information when the character information in the language corresponding to the country information has been recorded on the recording medium as the determined result of the determining step.

When application software is installed to a computer corresponding to the reproducing method of the present invention, the user can reproduce for example music from a CD loaded to a driver. In addition, when the loaded CD corresponds to the CD-TEXT format, CD-TEXT information (disc name, song name, and so forth) can be displayed on a computer display in the most proper language of a plurality of languages.

The above, and other, objects, features and advantage of the present invention will become readily apparent from the following detailed description thereof which is to be read in connection with the accompanying drawings.

BRIEF DESCRIPTION OF THE DRAWINGS

FIG. 5 is a schematic diagram showing data of all channels of a sub-code signal;

FIGS. 6A and 6B are schematic diagrams showing the data structure of a CD and the data structure of a TOC;

FIG. 7 is a schematic diagram showing the structure of TOC data recorded in a lead-in area of a conventional CD;

FIG. 16 is a schematic diagram showing the contents of data of a pack element (00h) of a size pack;

FIG. 17 is a schematic diagram showing the contents of data of a pack element (01h) of a size pack;

FIG. 18 is a schematic diagram showing the contents of data of a pack element (02h) of a size pack;

FIG. 19 is a schematic diagram showing the relation between language codes and language names;

FIG. 20 is a schematic diagram showing the relation between language codes and language names;

FIGS. 23A to 23C are schematic diagrams for explaining a table according to the embodiment of the present invention;

DETAILED DESCRIPTION OF THE PREFERRED EMBODIMENTS

Figure 1:
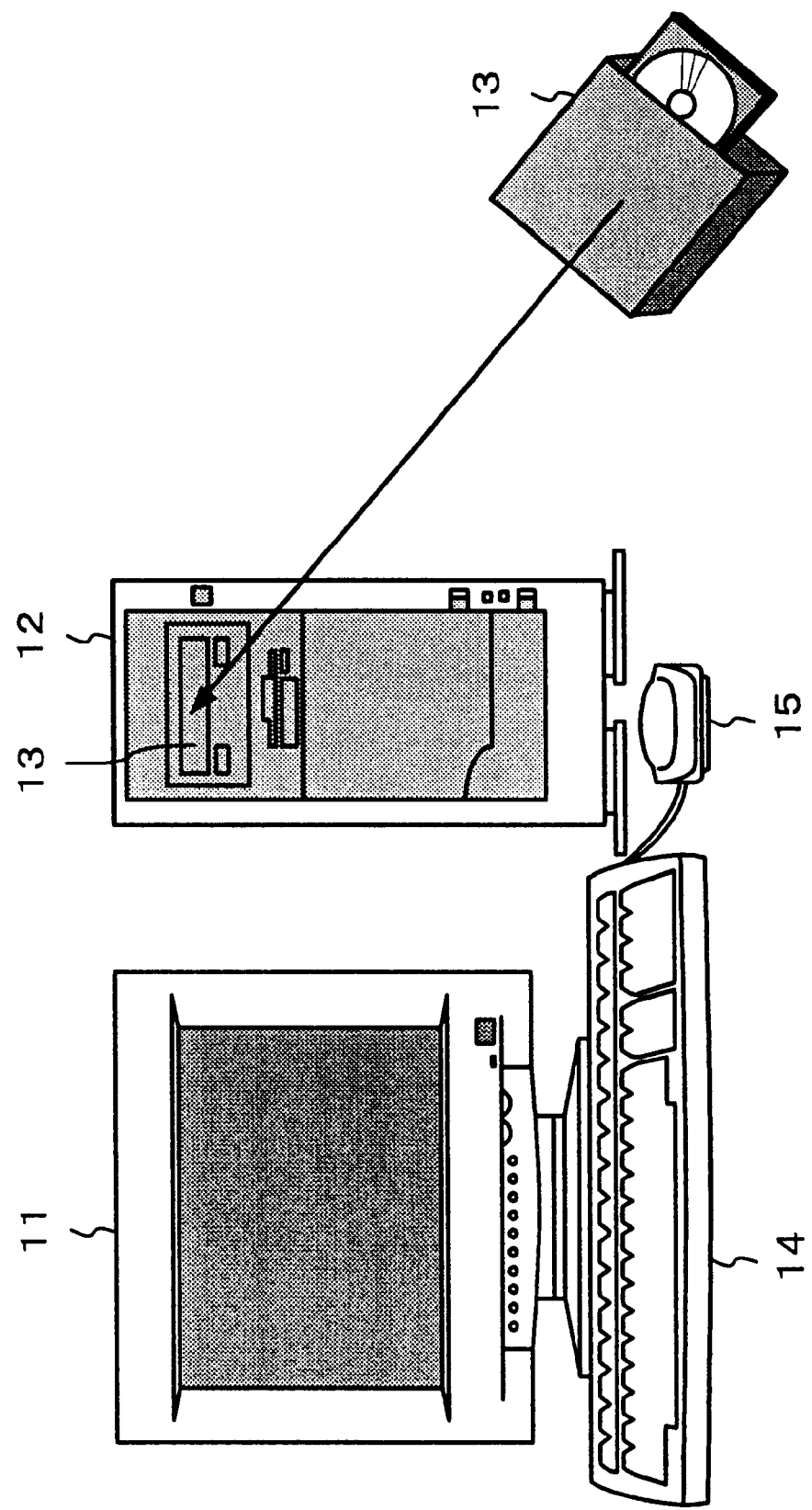
FIG. 1 is a schematic diagram showing a system structure according to an embodiment of the present invention.

Next, with reference to the accompanying drawings, an embodiment of the present invention will be described. FIG. 1 shows an outlined structure of a system according to an embodiment of the present invention. In FIG. 1, reference numeral 11 is a computer display. Reference numeral 12 is a main body of a personal computer. Reference numeral 13 is an optical disc drive disposed in the computer main body 12. Reference numeral 14 is a keyboard. Reference numeral 15 is a mouse. Such a personal computer is well-known. For example, a personal computer that operates with an OS (operating system) for example Windows 95 (registered trademark) can be used. It should be noted that the present invention can be applied to a computer that operates with another OS.

The optical disc drive 13 can reproduce data from an optical disc such as a CD, a CD-ROM, a CD-R (recordable, non-rewritable CD), a CD-RW (rewritable CD). When an application software for the reproducing method according to the embodiment of the present invention is installed to the computer main body 12, music information of a CD loaded by the drive 13 can be reproduced by a built-in speaker or an external speaker. In addition, when the loaded CD is a CD corresponding to the CD-TEXT format (CD-TEXT disc), the drive 13 reproduces CD-TEXT data from the lead-in area. The reproduced CD-TEXT data is read to the computer main body 12. The CD-TEXT data is decoded and thereby a disc name, a program name, and so forth corresponding to the CD-TEXT data are displayed on the display 11. The user can select a song with such information displayed.

In the embodiment of the present invention, as a record medium, a CD is used. However, it should be noted that the present invention is applied to other types of optical discs (for example, DVD (digital video disc)), a magnetic tape, an optical tape, and a semiconductor memory. In addition, digital main information recorded on a record medium may be video data or the like as well as audio data.

Figure 2:
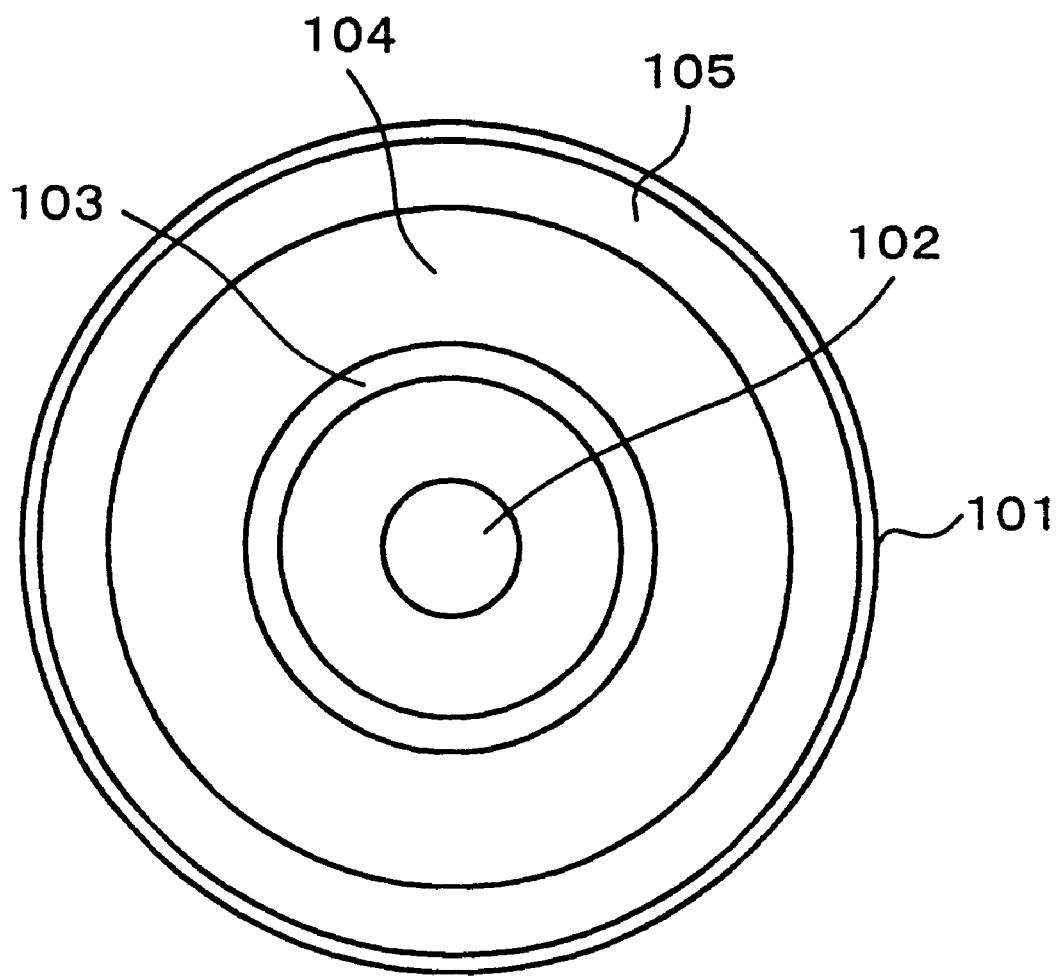
FIG. 2 is a schematic diagram showing areas of a conventional music reproducing CD according to the present invention.

For easy understanding of the present invention, the data structure of an audio reproducible CD and the CD-TEXT format will be described in succession. As shown in FIG. 2, the CD has a hole 102 at the center thereof. A lead-in area 103 as a program management area for TOC (Table Of Contents) data, a program area 104 for program data, and a lead-out area 105 as a program end area are disposed from an outer periphery of the hole 102 to an outer periphery of the CD. In the case of an audio reproducible CD, audio data is recorded in the program area 104. Time information and so forth of the audio data are managed in the lead-in area 103. After the audio data has been completely read from the program area 104 and the pickup of the CD reproducing unit has reached the lead-out area 105, the CD reproducing unit completes the CD reproducing operation.

On a CD, sub-codes have been recorded along with audio data as main data. Next, data of P and Q channels as sub-codes will be described. An audio signal recorded on the CD is sampled at a frequency of 44.1 kHz with 16 bits per sample or word. 16 bits of one sample or one word are divided into high order eight bits and low order eight bits as two symbols. An error correcting process and an interleaving process are performed symbol by symbol. Every 24 symbols of audio data are grouped as one frame. One frame is equivalent to six samples of each of stereo left and right channels.

Figure 3:
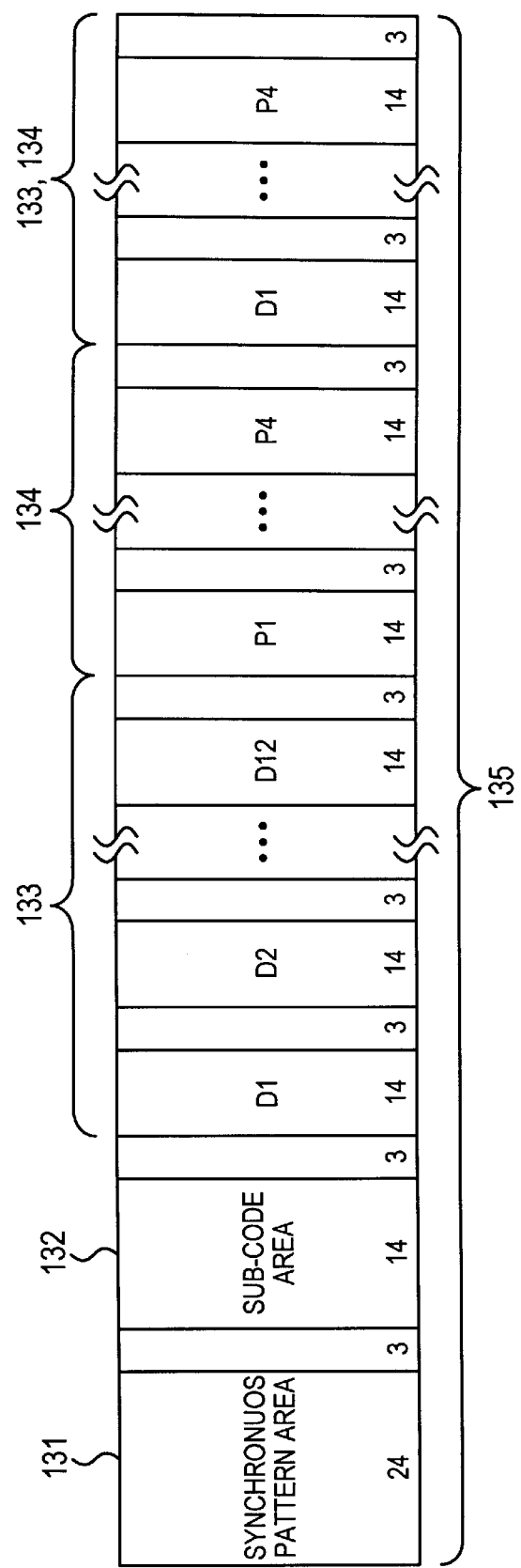
FIG. 3 is a schematic diagram showing data of one frame.

Eight bits as one symbol are converted into 14 bits by EFM modulating method. FIG. 3 shows the data structure of one frame that has been modulated by the EFM modulating method. Referring to FIG. 3, one frame 135 is composed of a synchronous pattern data area 131 of 24 channel bits, a sub-code area 132 of 14 channel bits, a program data area 133 having program data D1 to D12 of 12 symbols, a parity data area 134 having parity data P1 to P4 of four symbols, another program data area 133, and another parity data area 134. To connect each area or each data portion, connecting bits of three channel bits are disposed in each portion. Thus, one frame 135 is composed of data of a total of 588 channel bits.

Figure 4:
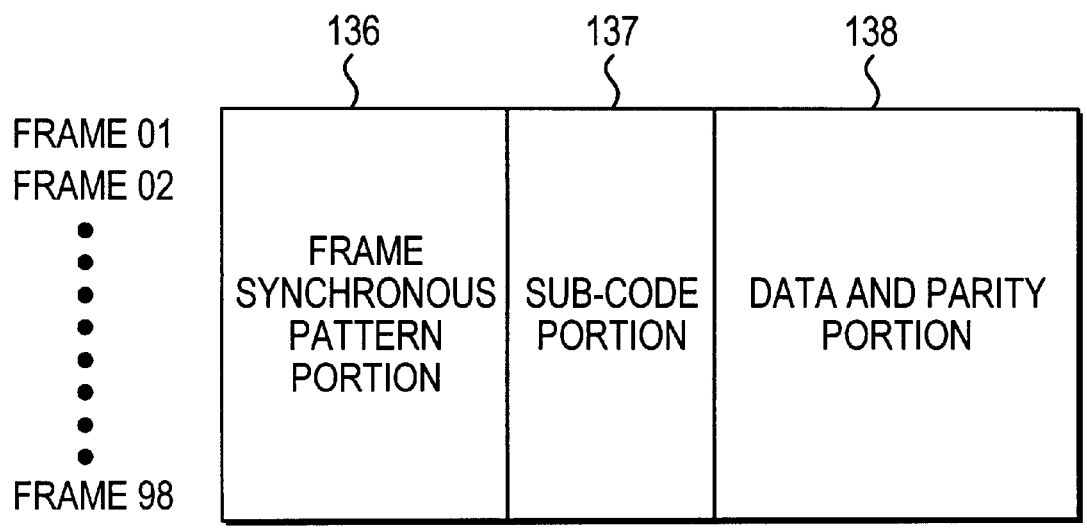
FIG. 4 is a schematic diagram for explaining a data structure of a sub-code frame.

FIG. 4 shows data structure of which 98 frames are arranged so that each area and each data portion of the frames 135 continue in vertical direction. A period of the 98 frames shown in FIG. 4 is a unit of one sub-code. The 98 frames are referred to as sub-code frame. The sub-code frame is composed of a frame synchronous pattern portion 136, a sub-code portion 137, and a data and parity portion 138. One sub-code is equivalent to $1/75$ seconds of reproduction time of a CD.

Sub-code data of P and Q channels is recorded in the sub-code portion 137 shown in FIG. 4. FIG. 5 shows the data structure of sub-code frames of the sub-code portion 137. Referring to FIG. 5, frame F01 and frame F02 are synchronous patterns S0 and S1 of the sub-code frames, respectively. As with a frame synchronous pattern, synchronous patterns S1 and S2 are out-of-rule patterns of the EFM modulating method (EFM: Eight to Fourteen Modulation). Each of eight bits of one symbol composes a sub-code of the P to W channels. For example, the P channel is composed of parts of S0 and S1 and P1 to P96.

Sub-codes of the P channel contain information that represents whether or not a program is present. The Q channel contains absolute time information of the current CD, time information of each program, a program number (also referred to as track number), a movement number (also referred to as index), and so forth. Thus, with information contained in the Q channel, a reproducing operation such as a program start position detecting operation can be controlled. In addition, when the information of the Q channel is displayed, the user can visually know the program number of the current program, the elapsed time of the program, and the absolute time of the program.

In addition, data of sub-codes of six channels from the R to W channels can be used for displaying a still picture, a song text, and so forth. A reproducing unit using these six channels from the R to W channels is well-known as CD-graphics. Recently, a format of which additional character information is recorded to the R to W channels of the lead-in area of a CD (CD-TEXT) has been proposed. In the case of the CD-TEXT format, character information of around 6500 characters can be recorded. In addition, additional character information of a CD is 800 characters or less in each of eight languages.

FIG. 6A shows data recorded on a CD. As was described with reference to FIG. 2, a lead-in area 103, a program area 104, and a lead-out area 105 are successively disposed from the inner periphery of the CD to the outer periphery thereof. TOC data, programs No. 1 to No. n, and data are recorded in the lead-in area 103, the program area 104, and the lead-out area 105, respectively.

As shown in FIG. 6B, the TOC data of a conventional CD is recorded in the Q channel as sub-codes. A sub-code has a data structure of which one frame is composed of 98 bits. 72 bits of 98 bits are data. The TOC data has a format shown in FIG. 6B.

When six programs are recorded on a CD, the data structure of the TOC is shown in FIG. 7. When POINT is in the range from 00 to 99, PMIN, PSEC, and PFRAME represent a start address (absolute time) of each program. When POINT is A0, PMIN represents the program number of the first program of the current disc. In this case, PSEC and PFRAME are 00. When POINT is A2, PMIN, PSEC, and PFRAME represent a lead-out start address. As shown in FIG. 7, these contents are repeated three times each. In addition, these contents are repeatedly recorded in the lead-in area. When the CD is loaded, the TOC data is read and stored.

Figure 8:
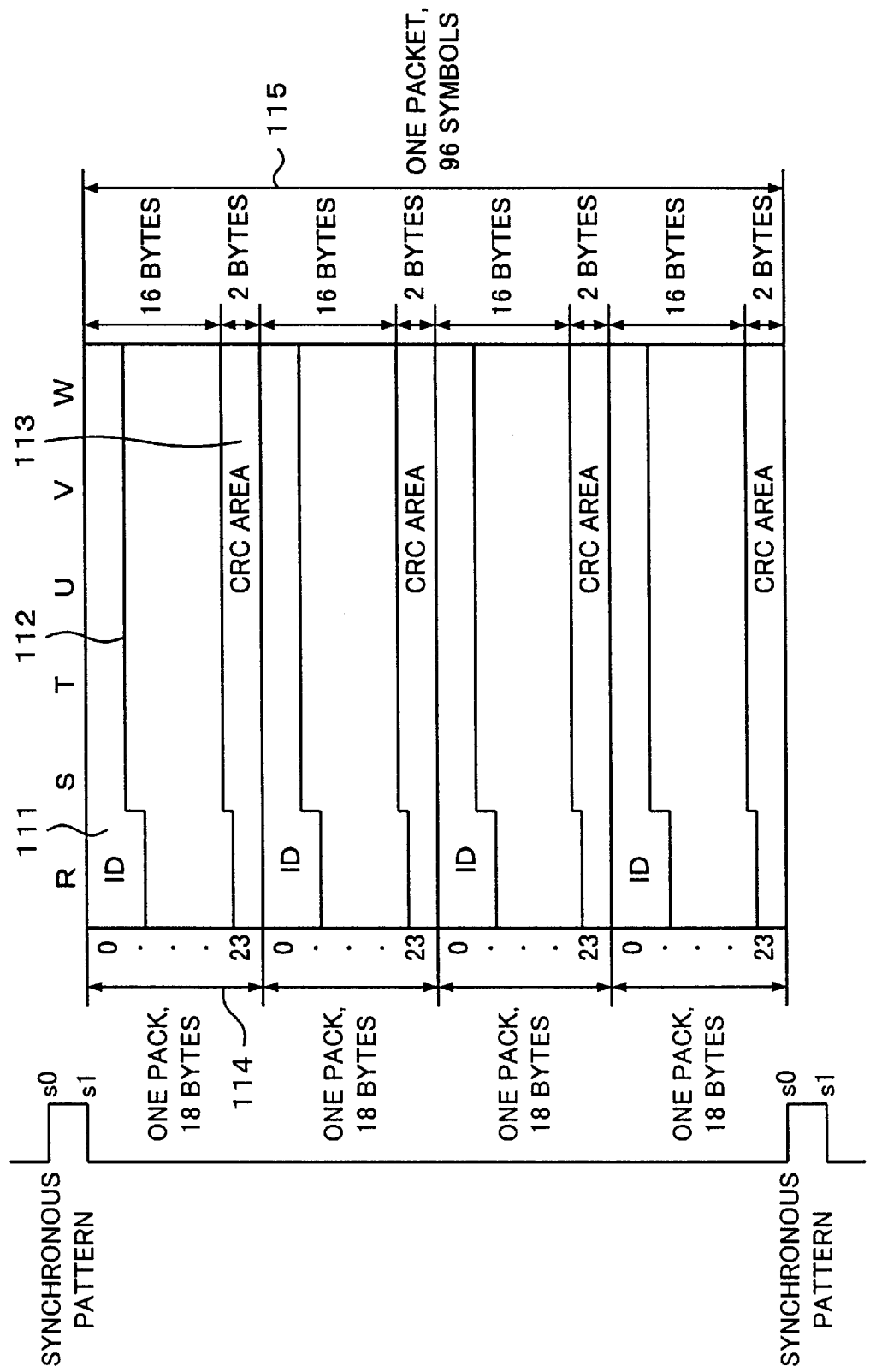
FIG. 8 is a schematic diagram showing data of all channels of a sub-code signal.

FIG. 8 shows the data structure of the CD-TEXT format (mode 4) according to the embodiment of the present invention. In the case of a conventional CD, as was described above, with data of 72 bits of one frame of sub-codes in the Q channel, the number of programs (songs) and record position of each program are managed. In reality, a program number ranging from 00 to 99, a start address (absolute time) of each program, the first program, the last program number, and a lead-out area start address are recorded. In addition to sub-codes in the Q channel, CD-TEXT data in the R to W channels as shown in FIG. 8 is recorded in the lead-in area.

The first two frames of data of the R to W channels are synchronous patterns S0 and S1. The remaining 96 frames contain 96 symbols each of which is composed of six bits. The 96 symbols are divided into four portions each of which is composed of 24 symbols. 24 symbols are referred to as one pack. Four packs are referred to as one packet.

At the beginning of each pack, an ID area 111 is disposed. In the ID area 111, an ID code of 24 bits is recorded. The ID code includes mode information for assigning a record mode of information recorded in the current pack, ID1 that represents the type of character information, and other ID codes (ID2, ID3, and ID4) that represent other identification information. The ID area 111 is followed by a text area 112 for character information associated with main data. The text area 112 is composed of eight-bit blocks. Each pack has a CRC area 113 of 16 bits for detecting an error with a CRC (Cyclic Redundancy Code). The ID area 111, the text area 112, and the CRC area 113 compose a pack area 114.

Figure 9:
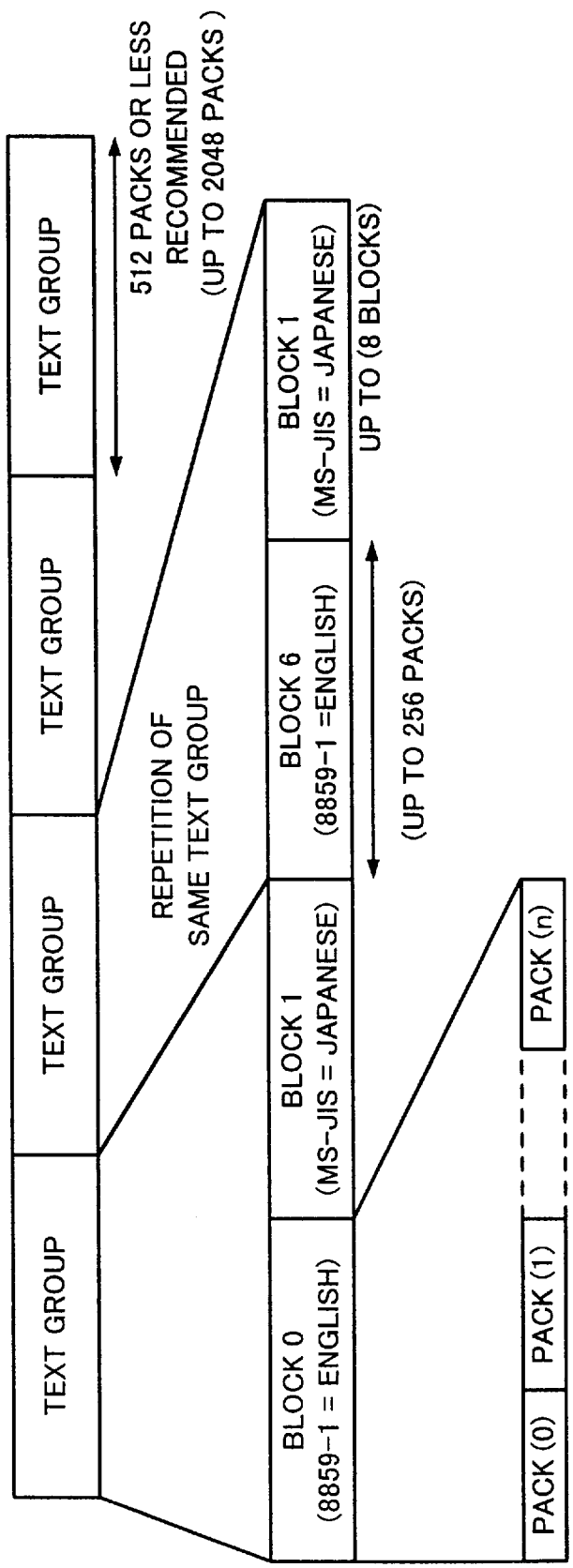
FIG. 9 is a schematic diagram showing a data format of sub-codes.

FIG. 9 shows an outlined structure of the CD-TEXT format. All character information is recorded in a text group. In the lead-in area, the same text group is repeatedly recorded. One text group is composed of up to eight blocks. FIG. 9 shows an example of which one text group is composed of two blocks (block 0 and block 1).

Block 0 contains English character information corresponding to character code 8859-1. Block 1 contains Japanese character information corresponding to character code MS-JIS. Each block is composed of pack 0 to pack n.

Figure 10A:
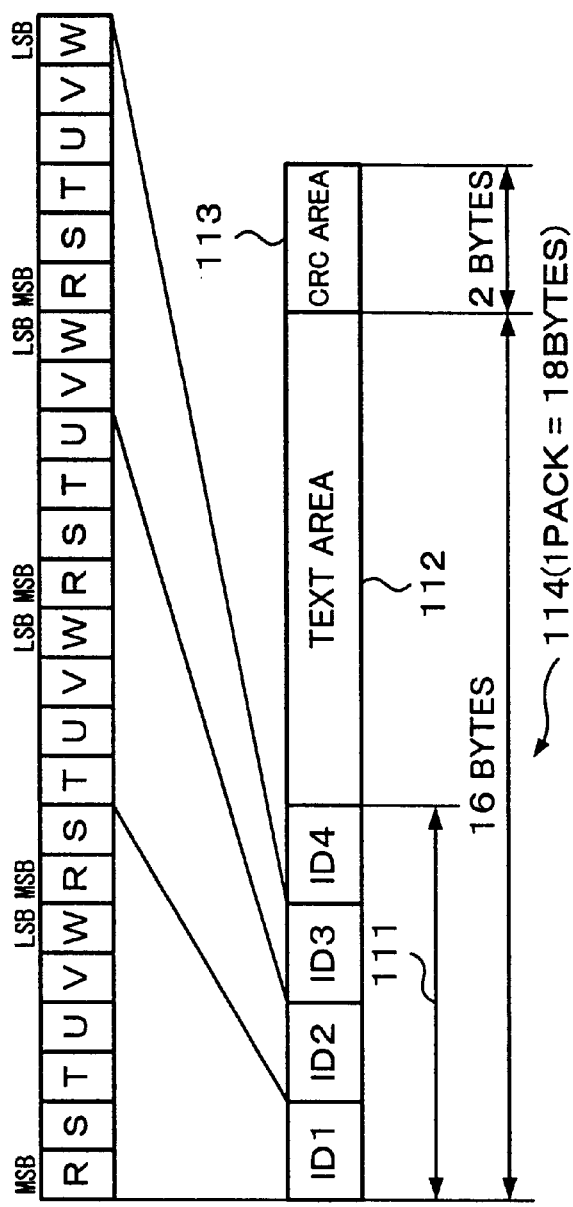
FIGS. 10A and 10B are schematic diagrams showing one pack and one symbol of a data format of a CD-TEXT.

FIG. 10A shows serial data in the data format shown in FIG. 8. As shown in FIG. 10A, the first 32 bits of data (only 24 bits are shown in FIG. 10A) are divided into four bytes and assigned to identification codes ID1, ID2, ID3, and ID4 as an ID (header) area 1. The ID (or header) area 1 is followed by a text area 112. The text area 112 is divided into byte data. The data length of the text area 112 is 12 bytes. The text area 112 is followed by a CRC area 113 of two bytes. The ID area 111, the text area 112, and the CRC area 113 are referred to as pack 114. The data length of the pack 114 is 18 bytes. Thus, the signal on the Q channel can be processed byte by byte. Consequently, the processing circuit becomes simple.

In the CD-TEXT format, an error is detected with only a CRC error detection code. When an error is detected, data is read. Thus, data is read whenever an error is detected. Consequently, in the TOC, data is written pack by pack four times. In addition, a data sequence is repeatedly recorded packet by packet. In other words, one pack that synchronizes with a sub-code sync with a period of 1/75 seconds contains four packs. In such a multiple recording operation, a complicated circuit for an error correction can be omitted.

The multiple writing operation for each pack is not limited to a four time writing operation. In addition, the multiple writing operation may be performed for each packet or every several packets rather than each pack.

Figure 10B:
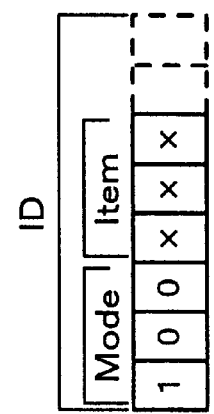

In addition, as shown in FIG. 10B, ID1 at the beginning of the ID area 111 is handled with eight bits that are larger by two bits than a conventional symbol. Data for identifying a particular mode is written to three bits after the MSB (inclusive) so as to prevent the reproducing unit having a decoding function for sub-codes of the R to W channels from malfunctioning. In the CD-TEXT format recorded in the lead-in area, as a mode represented with the three bits, before the CD-TEXT format is proposed, mode 4 ("100") that has not been defined is assigned. Thus, even if such a decoding function is provided to a conventional reproducing unit, only an unrecognizable mode is detected. Thus, the reproducing unit simply stops, not malfunctions. As undefined modes, mode 5 and mode 6 are considerable along with of mode 4. Thus, instead of mode 4, one of mode 5 and mode 6 may be used.

Figure 11:
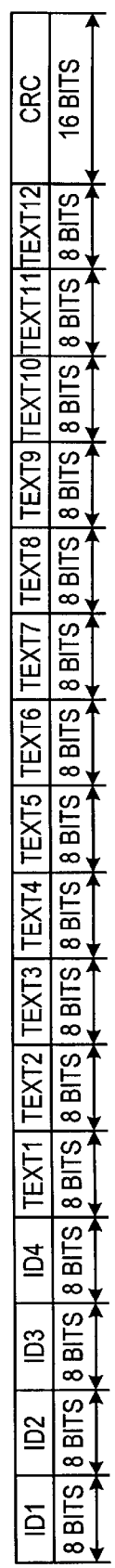
FIG. 11 is a schematic diagram showing a data format according to the embodiment of the present invention.

In the example of which mode 4 is represented with ID1, as shown in FIG. 11, one pack includes identification codes ID1, ID2, ID3, and ID4 (eight bits (one byte) each), text bytes text1 to text12, and a 16-bit CRC code.

Figure 12:
FIG. 12 is a schematic diagram showing the contents of data of ID1.

ID1 is composed of eight bits. FIG. 12 shows contents of data handled with ID1 and each pack. As described above, ID1 is denoted by (8xh) so as to represent mode 4 with high order bits (where h represents hexadecimal notation; x represent low order four bits).

ID1 represents the contents of a character string preceded by text1. (80h) represents an album name/program name. (81h) represents a performer name/conductor name/ orchestra name. (82h) represents a song writer name. (83h) represents a composer name. (84h) represents an arranger name. (85h) represents a message. (86h) represents a disc ID. (87h) represents a search keyword. (88h) represents a TOC. (89h) represents a 2nd TOC. (8ah), (8bh), and (8ch) represent reserved areas. (8dh) represents closed information. (8eh) represents UPC/EAN (POS code) of the album and ISRC of each track. (8fh) represents block size information. Reserved areas represent that these areas have not been currently defined and will be defined in future.

Figure 13:
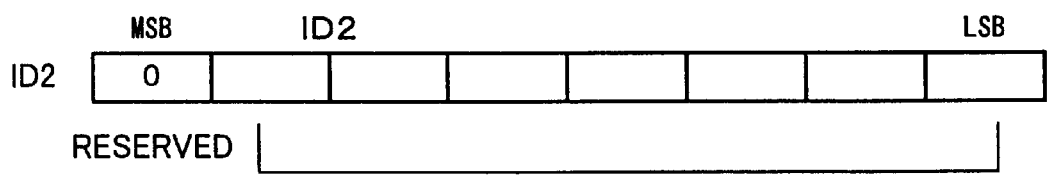
FIG. 13 is a schematic diagram showing the contents of data of ID2.

ID2 includes a one-bit extension flag and a seven-bit truck number or a seven-bit pack element number. The track number represents a track number to which the first character of the text data of the pack belongs. As shown in FIG. 13, a track number ranging from 1 to 99 is recorded to ID2. Thus, other values "0" and "100" (64h) or higher have special meanings. "00" represents information representative of the entire disc. MSB is always 0. When MSB is 1, it represents an extension flag. The pack element number is used depending on the type of a pack represented by ID1.

Figure 14:
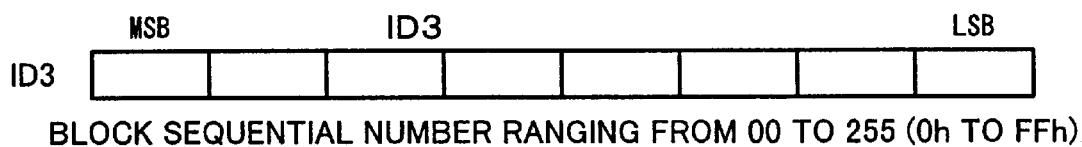
FIG. 14 is a schematic diagram showing the contents of data of ID3.

ID3 represents a pack sequential number. As shown in FIG. 14, the pack sequential number of a block ranges from 00 to 255 (0h to FFh). When ID3 is 0, it represents the first pack of ID1=80h.

Figure 15:
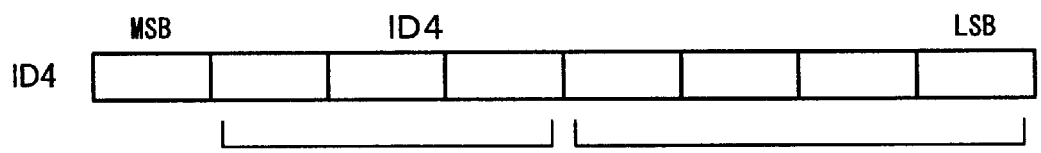
FIG. 15 is a schematic diagram showing the contents of data of ID4.

As shown in FIG. 15, ID4 includes a one-bit (MSB) DBCC (Double Byte Character Code) identification, a three-bit block number, and a four-bit pack character position information. When the current block includes a DBCC character string, the DBCC identification is "1". When the current block includes an S(Single)BCC character string, the DBCC identification is "0". The block number represents a block number to which the current pack belongs. The four-bit character position information represents the character position of text1 of the current pack. When the four-bit character position information is "0000", it represents that the character position is the first character. "0001" represents that the character position is the second character. "0010" represents that the character position is the third character. Likewise, "0011", "0100", . . . , represent that the character position is the fourth character, the fifth character, . . .

As described above, text data is composed of 12 bytes. The text data includes a character string or binary information corresponding to the type of a pack represented by ID1. When a pack is other than (ID1=88h), (ID1=89h), and (ID1=8fh), text data thereof is a character string. A character string is composed of characters and a null code as an end mark. When the character string is a SBCC character string, one null code is used. When the character string is a DBCC character string, two null codes are used. A null code is (00h). The size of each character string is preferably 160 bytes or less.

FIGS. 16, 17, and 18 show examples of the structure of a pack (ID1=8fh) of block size information corresponding to the present invention. FIG. 16 shows the data structure of a pack of pack element number=(00h). FIG. 17 shows the data structure of a pack of pack element number=(01h). FIG. 18 shows the data structure of a pack of pack element number= (02h).

ID3 represents the sequential number of a pack of (ID2= 00h) (see FIG. 16). ID4 represents a block number. ID4 is followed by text1 that represents a character code of the current block. The character code is used for a character string of a pack (ID1=80h to 85h). The character code of other packs is (00h). When the block number is 0, the character code is (00h). The character code is defined as follows.

00h=ISO 8859-1
01h=ISO 646, ASCII
02h~7F=Reserved
80h=MS-JIS
81h=Korean character code
82h=Mandarin (standard) Chinese character code
83h~FFh=Reserved For example, in the ISO 8859-1, alphanumeric characters, symbols, and so forth are represented with one byte. The ISO 8859-1 code is used as a standard character code.

text2 represents the first track number. text3 represents the last track number. text4 represents mode 2 and copy protection flag. One bit (MSB) of text4 is a flag that represents whether or not a CD-TEXT packet of mode 2 has been encoded to a program area. The remaining seven bits are used as a copy protection flag. text5 to text12 represent the number of packs of each of (ID1=80h)~(ID1=87h).

As with the pack shown in FIG. 16, in a pack (ID1=8fh, ID2=01h) (see FIG. 17), ID3 and ID4 represent a sequential number and a block number, respectively. text1 to text8 represent the number of packs of each of (ID1=88h)~(ID1=8fh). text9 to text12 represent the last sequential number of each of block 0 to block 3.

As with the packs shown in FIGS. 16 and 17, in a pack (ID1=8fh, ID2=02h) (see FIG. 18), ID3 and ID4 represent a sequential number and a block number, respectively. text1 to text4 represent the last sequential number of each of block 4 to block 7. When the last sequential number is (00h), it represents that no block is present. When no block is present, it is referred to as non-data block. text5 to text12 represent language codes of block 0 to block 7. A character code represents a data format type of each character of a character string. On the other hand, a language code represents the country of character information of each block.

FIGS. 19 and 20 are tables showing the relation between language codes (one byte each) and languages. The table shown in FIG. 19 lists language codes used in European countries. The table shown in FIG. 20 lists language codes used in other countries. The language codes in these lists are only examples. Thus, other language codes may be used.

Figure 21:
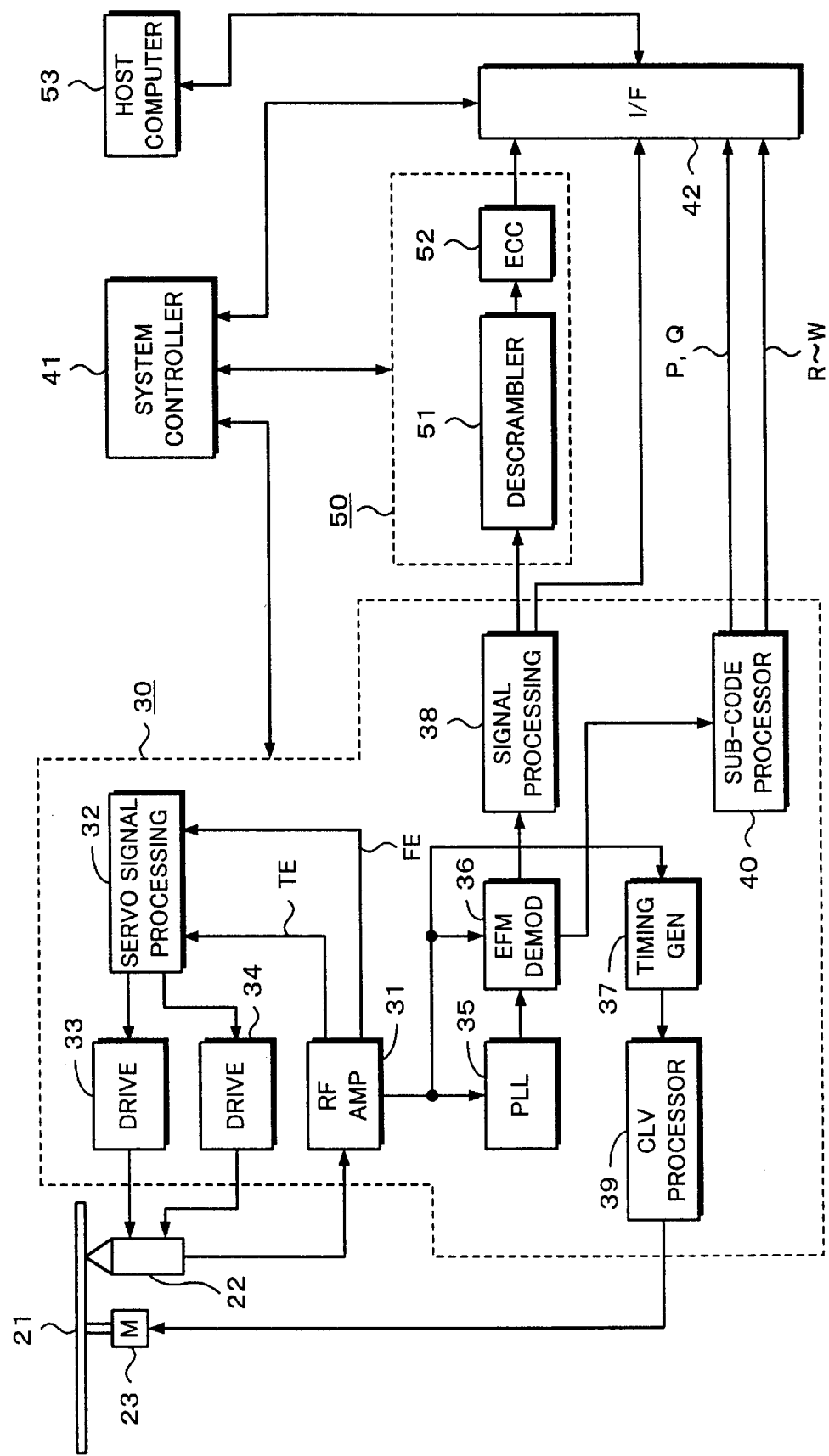
FIG. 21 is a block diagram showing a structure according to the embodiment of the present invention.

Next, with reference to FIG. 21, an example of an optical disc drive 13 according to an embodiment of the present invention will be described. The optical disc drive 13 can reproduce data from a CD-ROM, a CD, and a CD-TEXT. In FIG. 21, reference numeral 21 is a disc that is loaded to the drive. Data is reproduced from the drive. The disc 21 is rotated and driven by a spindle motor 23. An optical pickup 22 reads data from the disc 21.

A reproduction signal that is output from the optical pickup 22 is supplied to a servo and signal processing portion 30 that has the same structure as a CD player. The reproduction signal is supplied to an RF amplifier 31. The RF amplifier 31 has a function of an RF signal processing circuit. In other words, the RF amplifier 31 performs a process for digitizing an RF signal, a process for generating a tracking error signal TE and a focus error signal FE, and so forth. The error signals TE and FE are supplied to a servo signal processing circuit 32. The servo signal processing circuit 32 performs a focus controlling process and a tracking controlling process. A focus actuator and a tracking actuator of the optical pickup 22 are driven corresponding to signals received through driving circuits 33 and 34. A unit (not shown) that moves the pickup 22 to the direction of the disc diameter is controlled by a servo signal processing circuit 32.

A digitized reproduction signal received from the RF amplifier 31 is supplied to a PLL 35, an EFM demodulating circuit 36, and a timing generating circuit 37. The PLL 35 generates a clock signal that synchronizes with the reproduction signal. A digital audio signal received from the EFM demodulating circuit 36 is supplied to a signal processing circuit 38. The signal processing circuit 38 performs an error correcting process, an error data interpolating process, and so forth. A digital audio signal received from the signal processing circuit 38 is supplied to an interface 42. The interface 42 connects a computer main body 12 (a host computer 53 in FIG. 21) and an optical disc drive 13. The interface 42 is a SCSI interface, an ATAPI interface, or the like. A digital audio signal is reproduced as an audio signal by software (an application program) of the host computer 53.

The timing generating circuit 37 generates a timing signal that synchronizes with the reproduction signal. An output signal of the timing generating circuit 37 is supplied to a CLV processor 39. The CLV processor 39 drives the spindle motor 23 at CLV (Constant Linear Velocity). A sub-code separated by the EFM demodulating circuit 36 is supplied to a sub-code processor 40. The sub-code processor 40 performs a process for detecting an error of the sub-code and so forth. The sub-code processor 40 separately outputs data of sub-codes of the P and Q channels and data of sub-codes of the R to W channels. The sub-code data is supplied to the interface 42.

As described above, sub-codes in the R to W channels of the lead-in area contain CD-TEXT data. The CD-TEXT data is sent to the host computer 53 through the interface 42. A CD-TEXT data decoding process for separating character information from CD-TEXT data and displaying the character information on the display is performed by software of the host computer 53. A disc name, a song name, an artist name, and so forth corresponding to CD-TEXT data are displayed in English or another language on the computer display 11. Alternatively, instead of such software, hardware for decoding CD-TEXT data may be disposed in the host computer 53 or the drive.

When data is reproduced from a CD-ROM, an output signal of the servo and signal processing portion 30 is supplied to a CD-ROM signal processing portion 50. In a CD-ROM, the data length of a sub-code is defined as a data unit ($\frac{1}{75}$ seconds). In other words, the data length of 2352 bytes is treated as one block. At the beginning, a sync (12 bytes) is disposed. The sync is followed by a header (4 bytes). The header is followed by user data. The header contains an address similar to an absolute address of a sub-code of the Q channel of the CD. As the data structure of a CD-ROM, mode 0, mode 1, mode 2 (form 1), and mode 2 (form 2) have been defined. Data other than sync has been scrambled. In addition, each block is encoded with an error detection code or an error correction code.

After data is block-segmented, an error correction code encoding process and an EFM modulating process for a CD-ROM are performed as with data for a CD. The resultant data is recorded on a CD-ROM. Thus, the CD-ROM signal processing portion 50 includes a descrambler 51 and an error correcting circuit 52. The descrambler 51 descramble output data of the signal processing portion 38. The error correcting circuit 52 decodes output signal of the descrambler 51 with an error detection code or an error correction code. Reproduction data that is output from the error correcting circuit 52 is supplied to the host computer 53 through the interface 42.

The system controller 41 is a microcomputer. The system controller 41 controls the entire operation of the optical disc drive. In other words, the system controller 41 controls the servo and signal processing portion 30, the CD-ROM signal processing portion 50, and the interface 42. The disc reproduction data is supplied to the host computer 53 through the interface 42 corresponding to a read TOC command received from the host computer 53. Data supplied from the drive to the host computer 53 is referred to as return data.

The host computer 53 issues a read TOC command to the optical disc drive so as to reproduce the CD-TEXT data. The system controller 41 of the drive interprets the command and controls the optical pickup 22 to read data in the R to W channels of the lead-in area. Part of music CDs correspond to the CD-TEXT format. However, it is possible to cause CDs other than music CDs to correspond to the CD-TEXT format.

The drive sends back return data to the host computer 53. The return data includes a header having a code (identification data) that represents the data length of data that has been read. The header is the first four bytes (first to third bytes) of the return data. In reality, the data length excluding the first two bytes of the header is represented by zero-th and first byte of the header. The host computer 53 determines whether or not CD-TEXT data has been read corresponding to the header of the return data. When the CD-TEXT data has been read, the host computer 53 determines that the current disc is a CD-TEXT disc. Otherwise, the host computer 53 determines that the current disc is not a CD-TEXT disc. When the host computer 53 has determined that the current disc is a CD-TEXT disc, the host computer 53 reissues the read TOC command so as to obtain the CD-TEXT data.

Figure 22:
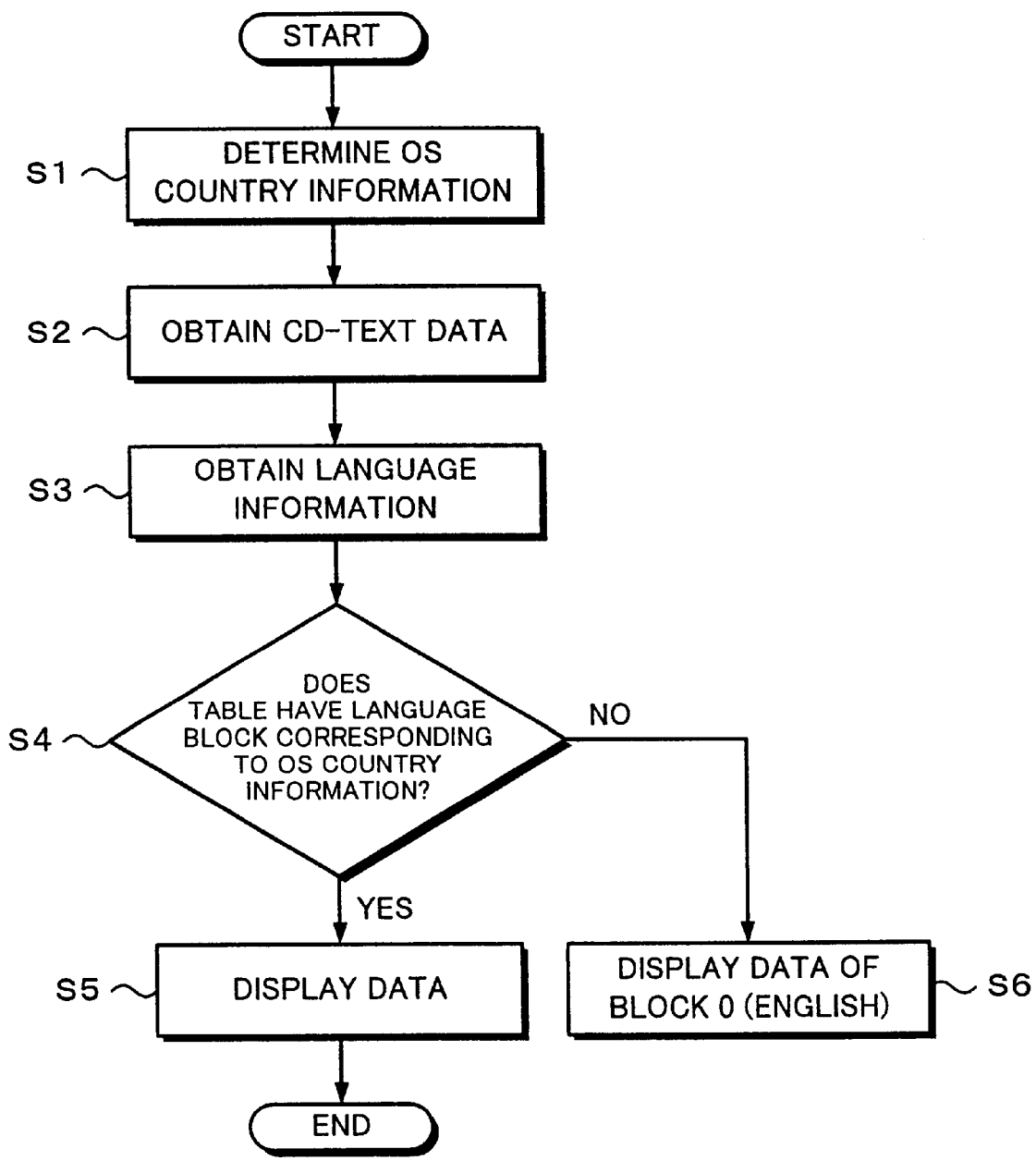
FIG. 22 is a flow chart for explaining the operation of the embodiment of the present invention.

In the above-described embodiment, a process for selecting a desired language of character information from a plurality of languages of CD-TEXT data will be described. The flow chart shown in FIG. 22 shows a process for starting an application program which is operated within the host computer 53. At step S1, the application determines country information of the operation system (OS). One-byte country information is written to the registry of the OS.

After a disc is loaded to the drive, the host computer 53 determines that the CD-TEXT disc has been loaded and then obtains CD-TEXT data (at step S2). As described above, the CD-TEXT data includes ID information, digest information, size information, and so forth as well as the character information. They are stored in the RAM of the host computer 53.

The RAM of the host computer 53 stores a language name table shown in FIG. 23A. The language name table is a table that lists the relation between language codes and language names (see FIGS. 19 and 20). The language names are represented corresponding to ISO 8859-1 that is the standard character code corresponding to the embodiment.

The obtained CD-TEXT data is processed pack by pack. The host computer 53 checks ID1 of one pack and determines whether the current pack is a size pack. When ID1=8fh, the host computer 53 performs a process for the size pack. As was described with reference to FIG. 18, a language code of block 0 to block 7 has been recorded in text5 to text12 of the pack (ID2=02h). Thus, the host computer 53 detects a language code from text5 to text12 of the pack (ID2=02h). The language code is stored to a language code table of the RAM of the host computer 53 (at step S3 shown in FIG. 22). As will be described later, a list of selectable languages is displayed as a language selectable menu.

The language code table shows the relation between blocks 0 to 7 and language codes. FIG. 23B shows an example of the relation. FIG. 23 shows the case that language codes of blocks 0, 1, 2, and 3 are English (language code=09h), Japanese (language code=69h), German (language code=69h), and French (language code=0Fh), respectively.

At step S4, it is determined whether or not one of the blocks 0 to 3 accords with the OS country information. To do that, as shown in FIG. 23C, the OS country information is converted into a language code with reference to the language name table (see FIG. 23A). At step S4, it is determined whether or not the language code table (see FIG. 23B) has a language code corresponding to the OS country information. Alternatively, the OS country information may be converted into a language name so as to determine whether or not the language of the converted language name matches the language of character information.

When the CD-TEXT data contains a block of a language name corresponding to the OS country information, character information of the block is displayed (at step S5). When the CD-TEXT data does not contain a block of the language name corresponding to the OS country information, English character information of the first block (block 0) is displayed by default (at step S6). Character information of other than block 0 may be displayed. In the CD-TEXT format, character information is always recorded to block 0. Thus, character information can be securely displayed.

Figure 24A:
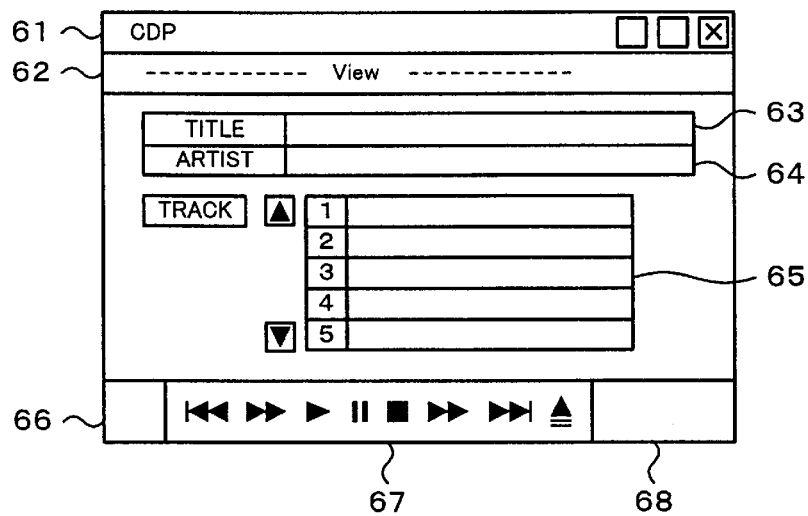
FIGS. 24A to 24C are schematic diagrams showing examples of windows on a display for explaining the embodiment of the present invention.

FIG. 24 shows real examples of windows on the display connected to the host computer 5. FIG. 24 shows the case that the application program is started with a Japanese OS. FIG. 24A shows a window in the case that the application program is started. In FIG. 24A, reference numerals 61 and 62 are menu bars. Reference numeral 63 is a disc name displaying portion. Reference numeral 64 is a performer name displaying portion. Reference numeral 65 is a song name displaying portion. Reference numeral 66 is a disc presence/absence displaying portion. Reference numeral 67 is an operation icon. Reference numeral 68 is a track number/time displaying portion. The application program causes all menus to be displayed in English. Thus, it is not necessary to provide resources corresponding to other languages. Consequently, the number of programming steps can be decreased.

Figure 24B:
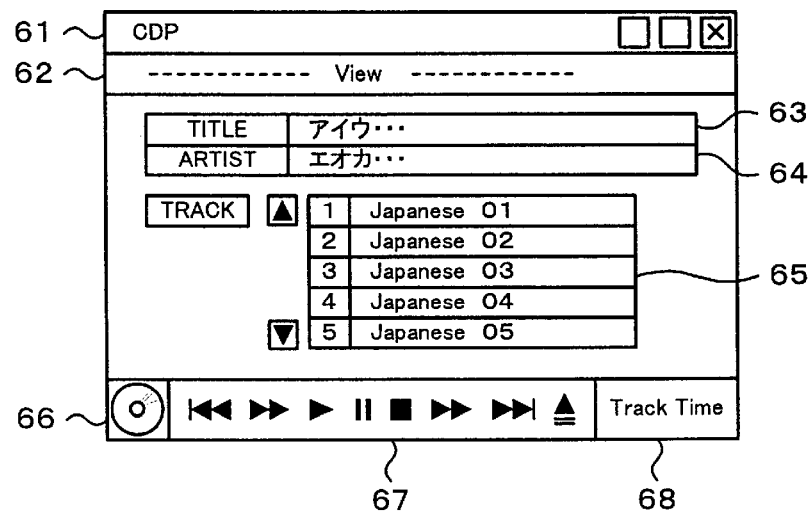

After the application is started, the application obtains the OS country information (in this example, Japanese) (at step S1). When a disc is loaded, the application obtains CD-TEXT data (at step S2) and then language information (at step S3). The application determines that the CD-TEXT data contains a block of Japanese corresponding to the OS country information (at step S4) and displays character information of the block of Japanese. FIG. 24B shows a window for character information of a block of Japanese.

In FIG. 24B, for simplicity, the disc name is abbreviated as "アイウ . . . ". The performer name is abbreviated as "エオカ . . . ". The song names (in Japanese) are abbreviated as "Japanese 01", "Japanese 02", . . . When song names are scrolled and the cursor is positioned at a desired song, the desired song is selected. An icon that represents that a disc has been loaded is displayed at the disc presence/absence displaying portion 66. When a particular icon of operation icons 67 is selected and clicked, a predetermined operation such as a playback operation or a stop operation can be performed as with those of a CD player.

Figure 24C:
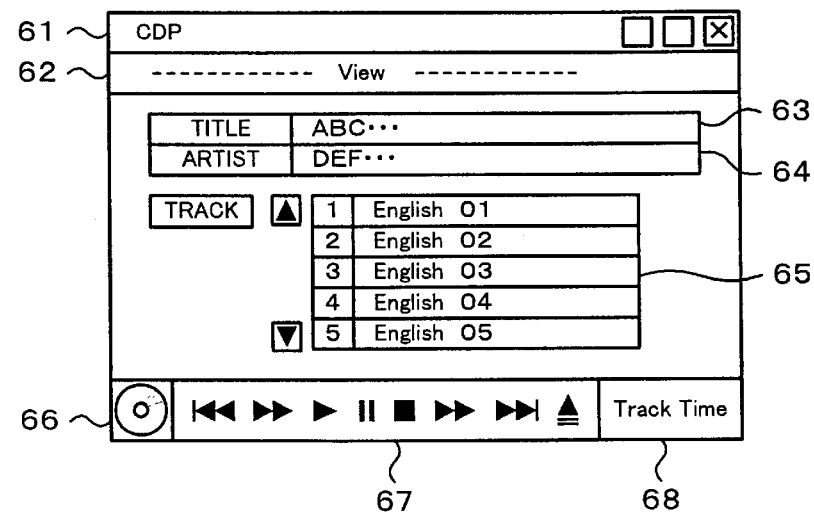

When the loaded CD-TEXT disc does not have a block of Japanese, character information of block 0 (English) is displayed (at step S6). FIG. 24C shows an example of which character information is displayed in English. In FIG. 24C, for simplicity, a disc name is abbreviated as "ABC . . . ". A performer name is abbreviated as "DEF . . . ". Song names (in English) are abbreviated as "English 01", "English 02", . . .

Figure 25:
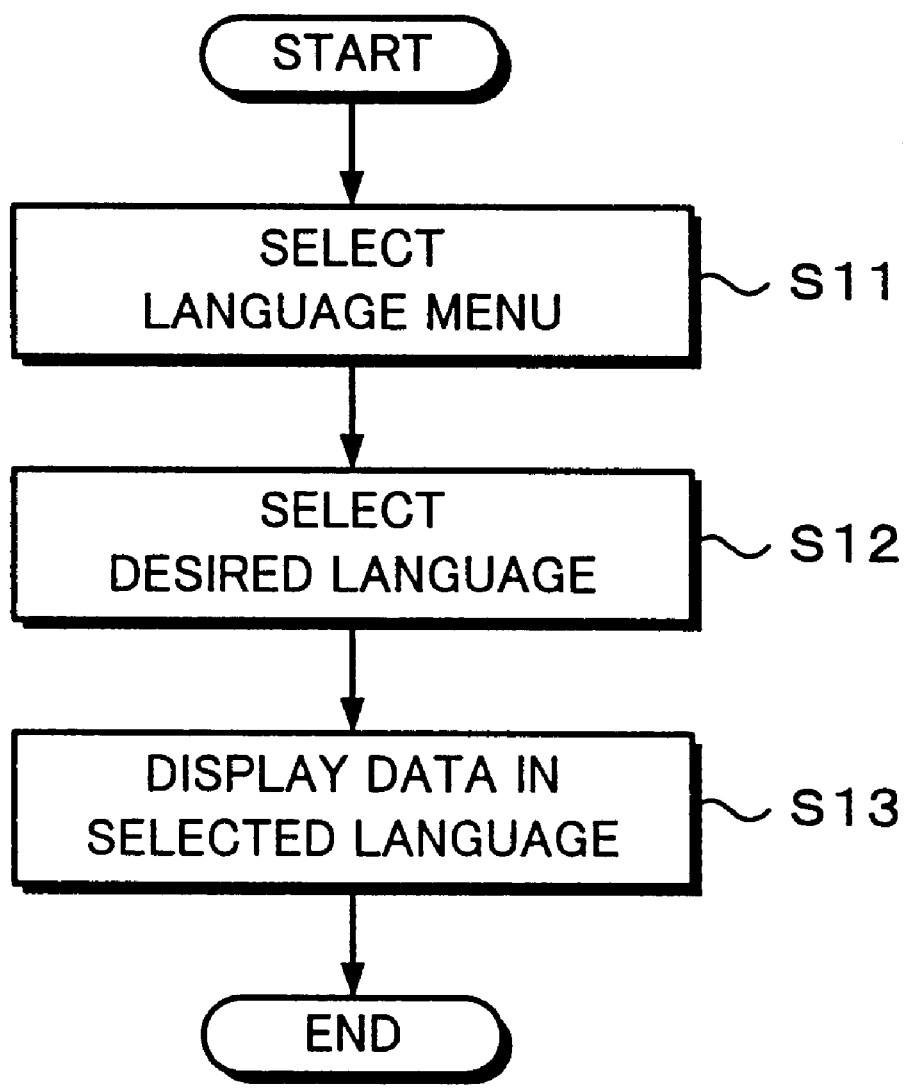
FIG. 25 is a flow chart for explaining the operation according to the embodiment of the present invention.
Figure 26A:
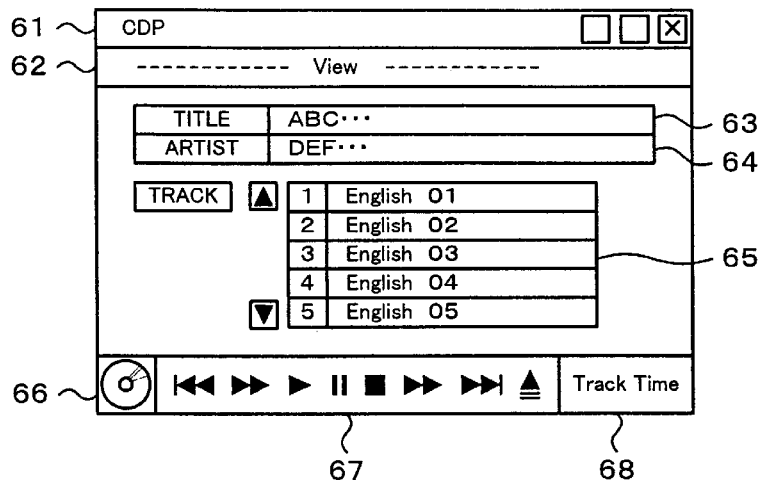
FIGS. 26A to 26C are schematic diagrams showing examples of windows on a display for explaining the embodiment of the present invention.

In the embodiment of the present invention, the user can designate the language of character information. FIG. 25 is a flow chart showing a process that allows the user to designate a desired language of character information to be displayed. While the application is being started, a language menu is selected (at step S11). FIG. 26A shows a window for character information displayed in English. When the cursor is positioned at a particular icon (for example, "View" 62*a*) of the title bar 62 on the window and then clicked, the language menu can be selected.

Figure 26B:
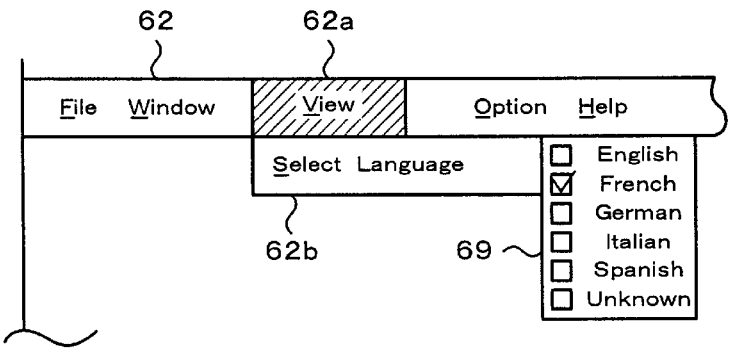
Figure 26C:
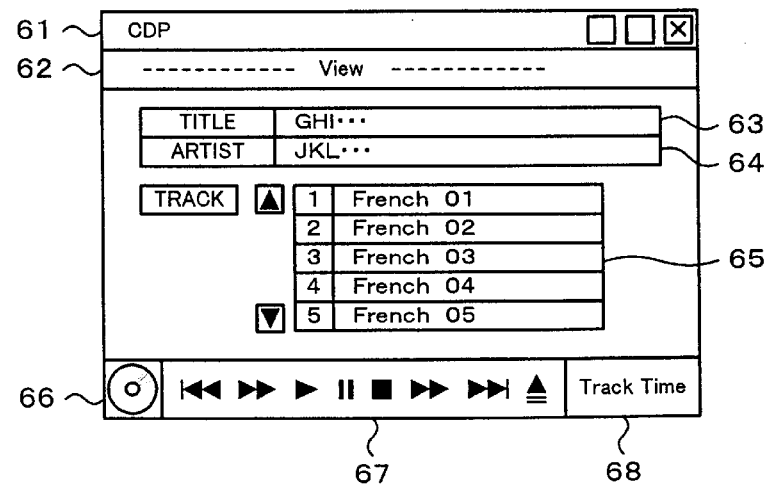

As shown in FIG. 26B, in a pull-down menu format, a menu "Select Language" and names of languages of character information recorded on a loaded disc are displayed. Names of languages of character information recorded on the disc can be displayed by referencing the language name table (see FIG. 23A) and the language code table (see FIG. 23B). FIG. 26B shows an example of a disc of which character information has been recorded in English, German, Italian, Spanish, and an unknown language. The user selects a desired language name from the pull-down menu (at step S12). FIG. 26C shows an example of which French has been selected. The selected language name may be displayed as inverted characters, blinked characters, or the like as well as a checked mark.

When a desired language is selected, the selected language data is displayed (at step S13). In this example, since character information in French has been selected, character information in English is switched to character information in French as shown in FIG. 26C. In FIG. 26C, for simplicity, a performer name in French is abbreviated as "GHI . . . ". Song names in French are abbreviated as "French 01", "French 02", . . . When another language is selected, character information corresponding to the selected language is displayed.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

As described above, according to the present invention, after a record medium is loaded, character information of a language code corresponding to the OS can be displayed on the display. Thus, the operation for selecting a desired language can be omitted. According to the present invention, with the language menu, the user can know the language of character information recorded on the record medium. In addition, the user can select character information in a desired language with the language menu.

What is claimed is:

1. A reproducing method for causing a computer operating according to a predetermined operating system to obtain data reproduced from a recording medium loaded to a drive of a computer, the recording medium being formatted in such a manner that a program and character information associated therewith are recorded on the recording medium, the character information being written in a plurality of languages, and including a plurality of language codes corresponding respectively to the plurality of languages recorded in a management area of the recording medium, the reproducing method comprising the steps of:

obtaining data reproduced from the management area of the recording medium by the drive including one of the plurality of language codes;

detecting one of the plurality of languages of the character information associated with program recorded on the recording medium corresponding to the one of the plurality of language codes obtained in the step of obtaining;

detecting country information of the predetermined operating system of the computer;

determining whether the character information of a language corresponding to the detected country information of the predetermined operating system is recorded on the recording medium; and displaying the information when the character information is determined to be in the language corresponding to the country information recorded on the recording medium.

2. The reproducing method as set forth in claim 1, wherein the displaying step further displays character information in a pre-designated language when the character information in the language corresponding to the country information of the predetermined operating system of the computer is not recorded on the recording medium.

3. The reproducing method as set forth in claim 1, further comprising the steps of:

displaying a list of the plurality of languages included in the character information associated with the program recorded on the recording medium and corresponding to the language codes; and selecting one language from the list.

4. The reproducing method as set forth in claim 3, wherein the list of the plurality of languages is one of a plurality of menus.

5. A recording medium from which a computer using a predetermined operating system reads a program and a reproducing method for causing the computer to obtain data reproduced from the recording medium loaded to a drive of the computer, the recording medium being formatted in such a manner that a program and character information associated with the program are recorded on the recording medium, the character information being written in a plurality of languages, and including a plurality of language codes corresponding respectively to the plurality of languages recorded in a management area of the recording medium, the reproducing method comprising the steps of:

obtaining data reproduced from the management area of the recording medium by the drive including one of the plurality of language codes;

detecting one of the plurality of languages of the character information associated with the program recorded on the recording medium corresponding to the one of the plurality of language codes obtained in the step of obtaining;

detecting country information of the predetermined operating system of the computer;

determining whether the character information of the language corresponding to the detected country information of the predetermined operating system is recorded on the recording medium; and displaying the character information when the character information is determined to be in the language corresponding to the country information recorded on the recording medium.

* * * * *